Figure 1:
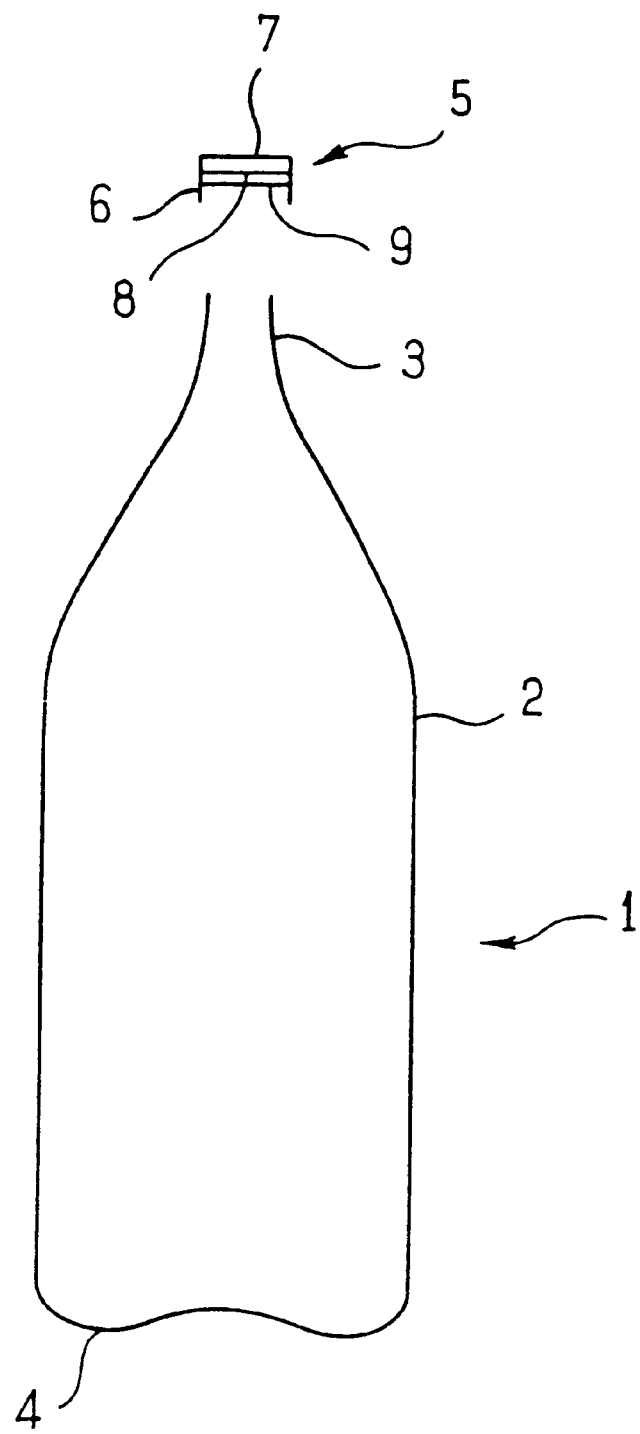

United States Patent [19]
Robichon

[11] Patent Number: 6,045,837
[45] Date of Patent: Apr. 4, 2000

[54] PACKAGING FOR ANETHOLE-BASED BEVERAGE, CONSISTING AT LEAST PARTIALLY OF A POLYMER CONTAINING CONDENSED AROMATIC UNITS

[75] Inventor: Patrice Robichon, Chatou, France

[73] Assignee: Pernod Ricard, Paris, France

[21] Appl. No.: 08/885,818

[22] Filed: Jun. 30, 1997

[30] Foreign Application Priority Data

Aug. 21, 1996 [FR] France .................................. 96 10355

[51] Int. Cl.[7] .............................. A23B 1/00; B65D 85/00; A23L 1/221; A23L 1/222
[52] U.S. Cl. ........................... 426/106; 426/650; 426/651
[58] Field of Search ................... 426/106, 650, 426/651

[56] References Cited

FOREIGN PATENT DOCUMENTS

| | | |
|---|---|---|
| 60-242049 | 12/1985 | Japan . |
| 61-279553 | 12/1986 | Japan . |
| 3039250 | 2/1991 | Japan . |
| 4039024 | 2/1992 | Japan . |
| 4039025 | 2/1992 | Japan . |
| 4223134 | 8/1992 | Japan . |

OTHER PUBLICATIONS

Database Abstract. Dialog. Fodline for Foodplas VIII–91:Pastics in food packaging. pp. 273–292. Publisher: Technomic Publishing, Lancaster, PA. Author: M. C. Muir, 1991.

Database Abstract. Dialog. PIRA for Packaging Strategies. vol. 14, No. 7. pages 1 and 2, Apr. 15, 1996.

Database Abstract. Dialog. Foodline for Points de Vente. 638. pp. 37–38, Apr. 10, 1996.

Database Abstract. Dialog. Foodline for Boissons de France. 397. p. 26, Jul. 1995.

Primary Examiner—Anthony J. Weier
Attorney, Agent, or Firm—Jacobson, Price, Holman & Stern, PLLC

[57] ABSTRACT

The invention relates to a monolayer or multilayer long-life packaging containing an anethole-based alcoholic or nonalcoholic beverage, characterized in that the layer in contact with the said beverage is formed from a polymer containing condensed aromatic units. The polymer is especially polyethylene naphthalate (PEN) which has a degree of crystallinity higher than 20%. The invention also relates to a process intended to limit the degradation of anethole-based beverages with the aid of such a polymer.

21 Claims, 2 Drawing Sheets

FIG_1

PACKAGING FOR ANETHOLE-BASED BEVERAGE, CONSISTING AT LEAST PARTIALLY OF A POLYMER CONTAINING CONDENSED AROMATIC UNITS

The present invention relates to a new packaging containing an alcoholic or nonalcoholic aqueous beverage based on anethole.

It also relates to a process intended to limit the loss of anethole present in an optionally alcoholic solution in contact with the polymer wall of a packaging and to the use of a polymer film for the production of a packaging in contact with optionally alcoholic anethole solutions in order to limit the loss of anethole in contact with the wall of the packaging.

Aniseed-flavoured beverages contain anethole or para-propenylmethoxybenzene, predominantly in trans form, (higher than 96–97%). Anethole has the special property of being very poorly soluble in water (<50 mg/l) and soluble in alcohol. In the presence of water anethole becomes cloudy, whereas in a water/alcohol solution of high alcohol content (of the order of 45% by volume) anethole remains in the dissolved state (2 g/l).

In the case of alcohol-free or weakly alcoholic beverages (4–9 vol. %) an emulsifier is resorted to because anethole is no longer soluble.

When aniseed-flavoured beverages are stored, considerable degradation appears in the course of time, especially under the effect of:

light (cis-trans isomerization), oxidation in the presence of light, interaction between anethole and the packaging material.

While it has been possible to overcome the first two abovementioned disadvantages with the aid of packages which are opaque to the ultraviolet and which act as a barrier to gases, this is not so with regard to the third point relating to the loss of anethole in contact with the packaging material.

In fact, in the case of the conventionally employed packaging made of polymer (polyethylene, polypropylene, polyvinyl chloride, polyethylene terephthalate) a very large loss of flavour (up to 100%) is observed in the course of time in contact with the polymer walls, and this prevents aniseed-flavoured beverages from being marketed in plastic packaging.

This problem is still more sensitive in the case of alcohol-free or weakly alcoholic beverages based on anethole, in the case of which the loss in contact with polymer is still more rapid.

A number of scientific observations illustrate the specific behaviour of this compound:

Anethole has a low solubility coefficient in water but a high solubility coefficient in polymers. This phenomenon is proportionally more important in the case of beverages which contain little or no alcohol. This induces a considerable electrostatic interaction with the surface of the polymer and the adsorption of anethole on the latter.

Furthermore, the affinity of anethole for polymers is such that an absorption phenomenon occurs, due to insertion of this compound between the chains of the polymer. A dynamic adsorption/absorption phenomenon is therefore involved.

In addition, anethole shows a strong tendency to polymerize to polyanethole. This polymerization of cationic type is promoted by the highly nucleophilic character of the methoxy group. This phenomenon occurs especially in the case of polymers derived from styrene, maleic anhydride or acrylonitrile which are commonly employed as packaging for beverages. This is due to the fact that anethole reacts with the molecular chains of these polymers.

However, anethole can also react with the residual monomers, given the well-known reaction of copolymerization with styrene (T. Higashimura et al., Journal of Polymer Science: part A.1, vol. 10, 85–93 (1972)) or the terpolymerization with maleic anhydride and acrylic monomers such as acrylonitrile (T. Kobuko et al., Macromolecules, vol. 3, No. 5, Sept–Oct. 1970, 518–523).

For all these reasons at the present time there is no known plastic packaging for anethole-based beverages.

This is why at the present time aniseed-flavoured beverages are packaged in glass bottles.

It is therefore desirable to propose new packaging made of polymer material enabling the inertness performance of glass to be attained or approached.

After systematic research, the Applicant Company has developed a new packaging intended to contain optionally alcoholic aniseed-flavoured beverages, which exhibits satisfactory characteristics, especially insofar as the absence of sorption of anethole is concerned.

It has been found, in fact, that, in contrast to polyethylene terephthalate, which exhibits very strong absorption with regard to anethole, the polymers which contain condensed aromatic units show, on the contrary, very weak absorption with regard to anethole.

This is why the subject-matter of the invention is firstly a packaging for an optionally alcoholic beverage including anethole, characterized in that the layer of the said packaging in contact with the said beverage is formed from a film of polymer containing condensed aromatic units.

"Packaging" will be understood to mean any monolayer or multilayer package capable of containing the said beverage, be it in the form of a bottle, can or other equivalent closed systems, including wineskins and pouches.

In the context of the present invention the concept of packaging extends also to the means of closure and of leakproofing of the various containers referred to above.

The present invention relates in particular to the means of closure for any packaging intended to contain an anethole-based beverage.

Such a means of closure is advantageously provided with an inner foil formed from a film of polymer containing condensed aromatic units, which is applied onto the opening of the said packaging.

It may in particular consist of a cylindrical cap inside which is housed an inner foil formed from a film of polymer containing condensed aromatic units, which is applied onto the opening of the said packaging.

Condensed aromatic units are intended in particular to mean divalent di- or tricondensed aromatic systems such as the divalent naphthalene or anthracene units.

These units are in particular present alternating with aliphatic units, these two types of units being linked by well-known chemical functional groups of ester, amide or urethane type. In many cases therefore copolymers are, in fact, involved.

It is well understood that these polymers are linear and therefore thermoplastic.

A second important characteristic of these polymers is their degree of crystallinity. It has been found, in fact, that a particularly low sorption is observed when the polymers have a degree of crystallinity higher than or equal to 20% and preferably between 20 and 45%, advantageously 20 and 30%.

Very briefly, it is known that crystallinity is related to the increase in order within polymer chains, especially due to the alignment of the latter relative to one another.

Processes are known which make it possible to increase the crystallinity, by virtue of a relaxation of the stresses by an annealing beyond 20% and even up to 45%. This is the case especially with polyethylene naphthalate.

So-called SRF or SRCF processes developed by the Sidel company may be mentioned among these processes.

The annealing may be performed by various techniques, especially using the hot mould technique or by softening of the biaxially drawn product.

The SRCF process is a particular embodiment of the general process, in which, in order to increase the crystallinity of the aromatic polyesters, the polyester in polymerized form is first biaxially drawn and then softened so as to relax the stresses induced by the biaxial drawing and then, and only then, given the definitive shape.

The SRCF process, which is derived from the cold process or two-stage process, begins with a preform manufactured on an independent press. The process subsequently includes 4 stages:
1) the body of the preform is heated,
2) an oversized first bottle is blown with biaxial orientation,
3) this bottle is passed into an infrared oven called "recovery oven"; two things happen: on the one hand the ring is crystallized and becomes white, on the other hand, under the effect of the temperature, 200° C. for approximately 1 minute 30 seconds, the body of the bottle contracts; the stresses induced during the biaxial drawing stages have relaxed, the bottle then assumes a "spudlike" shape, the density of the PEN of which the body of the article is composed has greatly increased, the PEN is from now on crystalline and has become heat-resistant,
4) the article is then finished by a second blowing with biaxial orientation, the bottle then adopting its definitive shape.

Among the polymers according to the invention, those advantageously chosen are the polyesters obtained by polycondensation of ethylene or, more generally, alkylene glycol and of di- or tricondensed aromatic diacids, especially naphthalic or anthracic acid. Among these, the polyester of ethylene glycol and of naphthalic acid (PEN) is preferred.

The packaging has been found particularly advantageous in the case of nonalcoholic or weakly alcoholic beverages whose alcohol content is preferably lower than 10% by volume, preferably between 3 and 9%.

In a known manner, the alcoholic acqueous beverage includes from 0.01 to 2 g/l of anethole, preferably 0.02 g/l or more of anethole.

In the concentrates to be diluted, such as the beverage known under the name "Pastis" the anethole concentration is of the order of 2 g/l. In alcoholic beverages which are ready to drink it is of the order of 200 to 400 mg/l. In the case of aniseed-flavoured beverages it is of the order of 10 to 50 mg/l.

It will be recalled that in the case of the alcoholic beverages of 45% strength by volume the anethole is entirely dissolved, whereas in the case of the alcohol-free or weakly alcoholic beverages (4–9% by volume) an emulsifier is resorted to in order to keep the anethole in the form of stable emulsion.

In general, besides the characteristics of a barrier to anethole, the packaging according to the invention must exhibit a sufficient imperviousness to carbon dioxide. It must also exhibit a tear strength and an elasticity modulus sufficient for the application considered.

The packaging must be in the form of a monolayer or in the multilayer form.

In the case of a multilayer packaging, the inner foil is formed from a polymer film containing condensed aromatic units. The film is associated, for example by means of an adhesive, with a structural material, itself optionally multilayer (metal, cardboard, polymeric mono- or multilayer material).

The thickness of the inner foil is between 50 and 200 $\mu$m and in general must be sufficient to satisfy the various criteria indicated above.

Cans made of metal, especially aluminium, internally covered with a polymer foil including condensed aromatic units may therefore be involved.

It may also be a question of cardboard boxes, commonly called "cartons", covered internally with a foil of polymer containing condensed aromatic units.

More particular mention will be made of bottles made up of an outer layer of polypropylene and an inner foil of polymer containing condensed aromatic units. These two layers are, for example, associated with the aid of an adhesive or liner.

According to a preferred embodiment the packaging is in the form of a monolayer of a polymer containing condensed aromatic units.

The thickness of the monolayer or multilayer bottles is generally from 0.2 to 0.5 mm in the case of the body and 0.5 to 2.5 mm in the case of the bottom, although these thicknesses can vary according to the size of the container.

The processing of such polymers is performed on a conventional injection blow moulding machine such as that employed for PET with or without biaxial orientation, according to the conventional single- or two-stage processes.

It therefore involves a relatively inexpensive processing not requiring the use of a machine that is specific to the product.

The packaging is therefore in the form of a monolayer or multilayer material obtained especially by injection blow moulding.

The packaging according to the invention can preserve an anethole-based beverage, in particular weakly alcoholic or nonalcoholic, in the same conditions as a glass bottle, that is to say without substantial degradation of the organoleptic properties.

They are in addition transparent in the case of monolayer packaging or multilayer packaging where the structural layers are transparent, easy to convert and cheap.

The invention also relates to a means of closure, especially for the said packaging, provided with an inner foil made of anethole-impervious material, especially a polymer containing condensed aromatic units, which is applied to the said packaging.

All the alternative forms indicated above and relating to the packaging apply to the said means of closure.

This means of closure is especially a cylindrical cap inside which is housed an inner foil of a polymer as defined above.

A bottle, seen in lengthwise section, is shown in FIG. 1, appended, in which the bottle 1 made up of a cylindrical body 2, a neck 3 and a bottom 4 consists of a polymer material made of polyethylene naphthalate.

The bottle has a thickness of 0.2 mm at the cylindrical body and of 0.6 mm at the bottom.

The cap 5 is made up of a cylindrical body 6 and of a circular base 7. Inside the cap 5 is housed a disc 8 formed from a layer of PEN 8 applied to the internal face of the base and a layer of PEN 9 which bears on the neck 3.

The invention also relates to the use of a polymer containing condensed aromatic units for the production of a monolayer or multilayer packaging for anethole-based beverages, in particular weakly alcoholic ones, in order to limit the loss of anethole in contact with the wall of the packaging, the said polymer forming the layer in contact with the said beverages.

The invention also relates to a process intended to limit the degradation of anethole-based beverages, especially weakly alcoholic or nonalcoholic ones, characterized in that the said beverages are stored in a monolayer or multilayer long-life packaging in which the layer in contact with the said beverages consists of a polymer containing condensed aromatic units.

The invention is now illustrated by the following examples, given by way of illustration.

EXAMPLE 1

Bottles consisting of a monolayer of polyethylene glycol naphthalate (PEN) with a crystallinity close to 25%, of 1.5 l, weighing 59 g, of mean thickness 0.2 mm in the case of the body and 0.6 mm in the case of the bottom were produced by injection blow moulding with biaxial orientation and heat-setting on hot moulds, using the conventional two-stage process.

The bottles are filled cold, in the presence of a bacteriostat, with a nonalcoholic, aniseed-flavoured solution containing 400 mg/l of anethole, and are then left for 12 months at 20° C.

The loss of anethole is evaluated at regular intervals. It is found that after 9 months the loss of anethole is 22% and that after one year it is 25%. A plateau is therefore observed starting at 9 months, the loss of anethole having changed little since then.

EXAMPLE 2 (comparative)

Bottles made from polyethylene terephthalate which have a degree of crystallinity of approximately 15% are filled with the same solution as that in Example 1 and are left for 12 months at 20° C.

The loss of anethole is evaluated at regular intervals. It is found that after 6 months the loss is 92% and, after 12 months, 100%.

Figure 2:
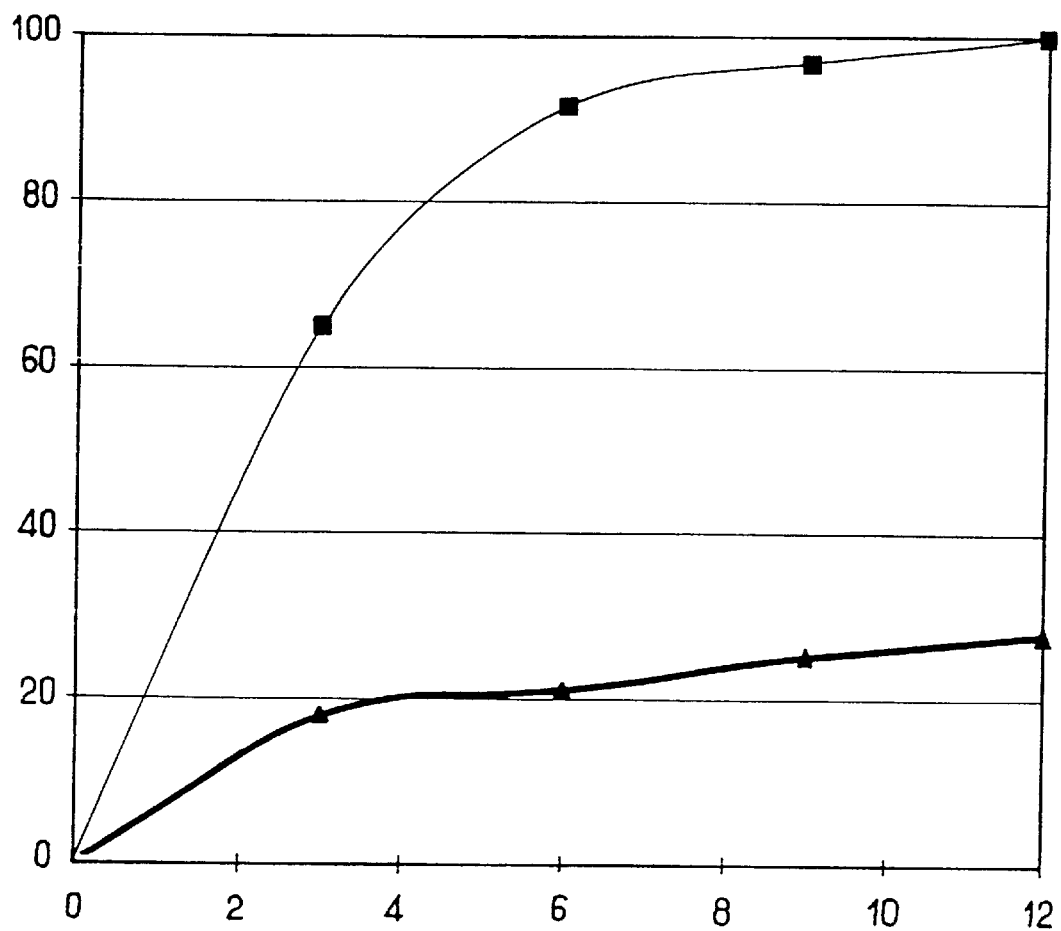

The results are summarized in the table below and in FIG. 2, where the percentage loss of anethole is shown in months (PEN -◄- PET -■-).

| Months | 0 | 3 | 6 | 9 | 12 |
|---|---|---|---|---|---|
| PEN | 0 | 5 | 16 | 22 | 25 |
| PET % | 0 | 65 | 92 | 97 | 100 |

This result is therefore wholly surprising, bearing in mind the small change in structure (naphthalene instead of benzene).

I claim:

1. Monolayer or multilayer long-life packaging containing an anethole-based, optionally alcoholic beverage comprising a layer in contact with the beverage formed from a polymer containing condensed aromatic units.

2. Packaging according to claim 1, wherein the condensed aromatic units are di- or tricondensed.

3. Packaging according to claim 1, wherein the polymer is a polyester of an alkylene glycol and of a condensed aromatic diacid.

4. Packaging according to claim 3, wherein the polyester is polyethylene glycol naphthalate (PEN).

5. Packaging according to claim 1, wherein the polymer containing condensed aromatic units has a degree of crystallinity higher than or equal to 20%.

6. Packaging according to claim 5, wherein the polymer containing condensed aromatic units has a degree of crystallinity of between 20 and 45%.

7. Packaging according to claim 1, in the form of a monolayer.

8. Packaging according to claim 7, in the form of a bottle of thickness of between 0.2 to 0.5 mm in a case of a body and 0.5 to 2.55 mm in a case of a bottom.

9. Packaging according to claim 7, wherein the bottle is provided with a means of closure a face of which facing an opening of the bottle is provided with an anethole-impervious material.

10. Packaging according to claim 1, wherein the beverage is nonalcoholic or alcoholic, the alcoholic beverage being weakly alcoholic.

11. Packaging according to claim 10, wherein the beverage includes up to 10% by volume of alcohol.

12. Packaging according to claim 11, wherein the beverage includes 3 to 9% by volume of alcohol.

13. Packaging according to claim 1, wherein the alcoholic or nonalcoholic aqueous beverage includes 0.01 to 2 g/l of anethole.

14. Packaging according to claim 13, wherein the alcoholic or nonalcoholic aqueous beverage includes 0.02 to 2 g/l of anethole.

15. Means of closure for packaging according to claim 1, provided with an inner foil formed from a film of polymer containing condensed aromatic units, which is applied onto an opening of the packaging.

16. Means for closure according to claim 15, consisting of a cylindrical cap inside which is housed an inner film of polymer containing condensed aromatic units, which is applied to the opening of the packaging.

17. Use of a polymer containing condensed aromatic units as defined by claim 1, for the production of a monolayer of multilayer packaging for anethole-based beverages in order to limit a loss of anethole in contact with a wall of the packaging, the polymer forming a layer in contact with the beverages.

18. Packaging according to claim 2, wherein the condensed units are divalent naphthalene or anthracene units.

19. Packaging according to claim 3, wherein the condensed aromatic diacid is naphthalic acid or anthracic acid.

20. Packaging according to claim 9, wherein the anethole-impervious material is a polymer containing condensed aromatic units.

21. Use according to claim 17, wherein the anethole-based beverages are weakly alcoholic.

* * * * *

UNITED STATES PATENT AND TRADEMARK OFFICE
CERTIFICATE OF CORRECTION

PATENT NO.    : 6,045,837
DATED         : April 4, 2000
INVENTOR(S)   : Patrice Robichon It is certified that error appears in the above-identified patent and that said Letters Patent is hereby corrected as shown below:

<u>Title page</u>,
Item [30], Foreign Application Priority Data

Aug. 21, 1996 (FR) France .................. 96 10335

Signed and Sealed this

Thirtieth Day of October, 2001

Attest:

Attesting Officer

NICHOLAS P. GODICI
Acting Director of the United States Patent and Trademark Office